US009209939B2

(12) United States Patent
Xu

(10) Patent No.: US 9,209,939 B2
(45) Date of Patent: Dec. 8, 2015

(54) MICROWAVE COMMUNICATIONS DEVICE AND MICROWAVE COMMUNICATIONS SYSTEM

(71) Applicant: Huawei Technologies Co., Ltd., Shenzhen, Guangdong (CN)

(72) Inventor: Shaofeng Xu, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/584,269

(22) Filed: Dec. 29, 2014

(65) Prior Publication Data

US 2015/0117572 A1    Apr. 30, 2015

Related U.S. Application Data

(63) Continuation of application No. PCT/CN2012/078183, filed on Jul. 4, 2012.

(51) Int. Cl.
*H01P 1/161* (2006.01)
*H04L 1/00* (2006.01)
*H04L 5/14* (2006.01)
*H04B 1/00* (2006.01)

(52) U.S. Cl.
CPC .............. *H04L 1/0091* (2013.01); *H01P 1/161* (2013.01); *H04B 1/00* (2013.01); *H04L 1/0031* (2013.01); *H04L 5/14* (2013.01)

(58) Field of Classification Search
CPC ...... H01P 1/161; H01P 1/2131; H01P 1/2138
USPC ........................................... 375/220
See application file for complete search history.

(56) References Cited

U.S. PATENT DOCUMENTS

| 6,262,690 | B1 | 7/2001 | Malone et al. |
| 6,388,537 | B1 | 5/2002 | Matsumoto |
| 2003/0128168 | A1 | 7/2003 | Desargant et al. |
| 2004/0097189 | A1* | 5/2004 | Bongfeldt et al. ............ 455/7 |
| 2006/0046638 | A1* | 3/2006 | Takeuchi et al. ......... 455/3.02 |
| 2007/0296518 | A1 | 12/2007 | Avramis et al. |
| 2012/0093100 | A1 | 4/2012 | Qin et al. |

FOREIGN PATENT DOCUMENTS

| CN | 1613166 A | 5/2005 |
| CN | 201118583 Y | 9/2008 |

(Continued)

*Primary Examiner* — Kevin Kim

(57) ABSTRACT

The present invention discloses microwave communications devices. The microwave communications device includes: a first converting module, a second converting module, configured to perform mutual conversion between a baseband signal or an intermediate frequency signal and a microwave signal, where microwave signals received or output by the first converting module and the second converting module respectively have a same polarization direction or perpendicular polarization directions; and an orthomode transducer with three waveguide ports, configured to perform separation and synthesis of orthogonally polarized microwave signals, The microwave communications devices in embodiments of the present invention can, by providing dual channels and integrating an orthomode transducer inside the microwave communications device, increase a transmission capacity while improving equipment application flexibility, reducing installation complexity, and lowering costs.

19 Claims, 5 Drawing Sheets

(56) References Cited

FOREIGN PATENT DOCUMENTS

| CN | 102299425 A | 12/2011 |
| CN | 202127100 U | 1/2012 |
| JP | 2000295002 A | 10/2000 |
| WO | WO 2010/056609 A2 | 5/2010 |
| WO | WO 2011/056255 A1 | 5/2011 |

* cited by examiner

MICROWAVE COMMUNICATIONS DEVICE AND MICROWAVE COMMUNICATIONS SYSTEM

CROSS-REFERENCE TO RELATED APPLICATIONS

This application is a continuation of International Application No. PCT/CN2012/078183, filed on Jul. 4, 2012, which is hereby incorporated by reference in its entirety.

TECHNICAL FIELD

The present invention relates to the communications field, and in particular, to a microwave communications device and a microwave communications system in the communications field.

BACKGROUND

In a digital microwave communications system, a 1+1 hot standby manner is usually selected to improve communication reliability. That is, for two devices having a same working frequency, only one device is working; when the only working device fails, a switchover to the other standby device is performed immediately, thereby ensuring communication reliability.

In another aspect, in a digital microwave communications system, a 2+0 manner or cross polarization interference cancellation ("XPIC" for short) manner is usually selected to improve a transmission capacity. The 2+0 manner refers to that two devices are working at the same time and have different working frequencies, and therefore, a transmission capacity of a system can be doubled in comparison with a single device or single channel. The XPIC manner, namely a polarization diversity manner, refers to that two devices are working at the same time and have a same working frequency, but the two devices use a manner of reusing a co-channel or interleaved additional channel cross-polarization frequency to improve spectrum utilization, thereby enabling a transmission capacity of a system to be doubled.

However, currently outdoor units ("ODU"s for short) are all single-channel. A system needs to have two ODUs to implement a 1+1 hot standby manner, a 2+0 manner, or an XPIC manner. Moreover, in an application of the 2+0 manner, an external coupler needs to be added to the system; and in an application of the XPIC manner, an external orthomode transducer ("OMT" for short) needs to be added to the system. Therefore, in an actual application, not only costs of devices are increased, but also installation space of various devices configured externally is considerably increased, thereby increasing device installation complexity, further increasing costs, and meanwhile leading to an inflexible device application.

SUMMARY

Embodiments of the present invention provide a microwave communications device and a microwave communications system to solve a technical problem of an inflexible application of a present microwave communications device and a microwave communications system and complex and relatively costly installation.

According to a first aspect, a microwave communications device is provided, including: a first converting module and a second converting module, configured to perform mutual conversion between a baseband signal or an intermediate frequency signal and a microwave signal, where microwave signals received or output by the first converting module and microwave signals received or output by the second converting module respectively have a first polarization direction and a second polarization direction, and the first polarization direction and the second polarization direction are the same or perpendicular to each other; and an orthomode transducer, configured to perform separation and synthesis of orthogonally polarized microwave signals, where the orthomode transducer includes a first waveguide port, a second waveguide port, and a third waveguide port, where polarization directions of microwave signals received or output by the first waveguide port and microwave signals received or output by the second waveguide port are perpendicular to each other, the first waveguide port is connected to the first converting module, the second waveguide port is connected to the second converting module, and the third waveguide port is connected to an antenna system.

In a first possible implementation manner of the first aspect, the first converting module and the second converting module have a same working frequency channel number, and the first polarization direction and the second polarization direction are perpendicular to each other.

With reference to the first aspect or the first possible implementation manner of the first aspect, in a second possible implementation manner, the microwave communications device further includes a waveguide switch, where the waveguide switch is configured to selectively switch between a first connection position and a second connection position, and is used for polarization conversion between microwave signals, so that: when the waveguide switch is in the first connection position, the waveguide switch is connected to the second converting module and the first waveguide port of the orthomode transducer and a received or output microwave signal has the first polarization direction; when the waveguide switch is in the second connection position, the waveguide switch is connected to the second converting module and the second waveguide port of the orthomode transducer and a received or output microwave signal t has a polarization direction perpendicular to the first polarization direction.

With reference to the second possible implementation manner of the first aspect, in a third possible implementation manner, when the waveguide switch is in the first connection position, the working frequencies of the first converting module and the second converting module are the same.

With reference to the second possible implementation manner of the first aspect, in a fourth possible implementation manner, when the waveguide switch is in the first connection position, the working frequencies of the first converting module and the second converting module are different.

With reference to the second possible implementation manner of the first aspect, in a fifth possible implementation manner, when the waveguide switch is in the second connection position, the working frequencies of the first converting module and the second converting module are the same.

With reference to the first aspect or any of the first to the fifth possible implementation manners of the first aspect, in a sixth possible implementation manner, the first converting module and the second converting module include a transceiver unit and a duplexer.

With reference to the first aspect or any of the first to the sixth possible implementation manners of the first aspect, in a seventh possible implementation manner, the first converting module and/or second converting module further includes an isolator.

According to a second aspect, a microwave communications system is provided, including: the microwave communications device according to the embodiment of the present invention; a feeder, configured to connect the microwave communications device to an indoor unit or a base station; and an antenna system, configured to receive and send a microwave signal, where the antenna system is connected to the microwave communications device. The microwave communications device includes: a first converting module and a second converting module, configured to perform mutual conversion between a baseband signal or an intermediate frequency signal and a microwave signal, where microwave signals received or output by the first converting module and microwave signals received or output by the second converting module respectively have a first polarization direction and a second polarization direction, and the first polarization direction and the second polarization direction are the same or perpendicular to each other; and an orthomode transducer, configured to perform separation and synthesis of orthogonally polarized microwave signals, where the orthomode transducer includes a first waveguide port, a second waveguide port, and a third waveguide port, where polarization directions of microwave signals received or output by the first waveguide port and microwave signals received or output by the second waveguide port are perpendicular to each other, the first waveguide port is connected to the first converting module, the second waveguide port is connected to the second converting module, and the third waveguide port is connected to an antenna system.

In a first possible implementation manner of the second aspect, the microwave communications system further includes: a radio frequency cable, configured to connect the microwave communications device and the antenna system.

Based on the foregoing technical solutions, the microwave communications device and the microwave communications system according to the embodiments of the present invention can improve flexibility of device applications, reduce installation complexity, and lower costs by providing dual channels and integrating an orthomode transducer inside the microwave communications device.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
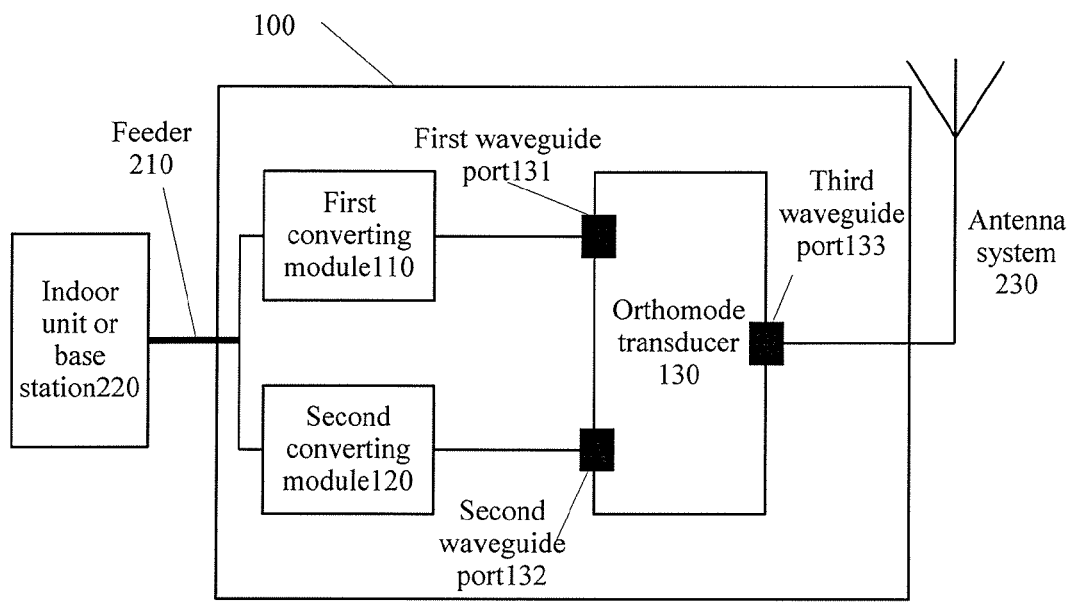
FIG. 1 is a schematic block diagram of a microwave communications device according to an embodiment of the present invention.

FIG. 1 shows a schematic block diagram of a microwave communications device 100 according to an embodiment of the present invention. As shown in FIG. 1, the microwave communications device 100 includes:

a first converting module 110 and a second converting module 120, configured to perform mutual conversion between a baseband signal or an intermediate frequency signal and a microwave signal, where microwave signals received or output by the first converting module 110 and microwave signals received or output by the second converting module 120 respectively have a first polarization direction and a second polarization direction, and the first polarization direction and the second polarization direction are the same or perpendicular to each other; and an orthomode transducer 130, configured to perform separation and synthesis of orthogonally polarized microwave signals, where the orthomode transducer 130 includes a first waveguide port 131, a second waveguide port 132, and a third waveguide port 133, where polarization directions of microwave signals received or output by the first waveguide port 131 and microwave signals received or output by the second waveguide port 132 are perpendicular to each other, and the first waveguide port 131 is connected to the first converting module 110, the second waveguide port 132 is connected to the second converting module 120, and the third waveguide port 133 is connected to an antenna system 230.

In this embodiment of the present invention, the first converting module 110 and the second converting module 120 both can be configured to convert a baseband signal or an intermediate frequency signal into a microwave signal, and convert a microwave signal into a baseband signal or an intermediate frequency signal to form dual channels inside the microwave communications device 100; in addition, the microwave signal received or output by the first converting module 110 or the second converting module 120 has a polarization direction, such as a horizontal polarization direction or a vertical polarization direction. In addition, the orthomode transducer 130 integrated inside the microwave communications device 100 enables a microwave communications device to work in various manners, which not only improves a transmission capacity of a system but also increases flexibility of device applications.

In another aspect, the dual channels are formed and the orthomode transducer 130 is integrated inside the microwave communications device 100, which can effectively avoid problems such as large installation space, complex installation, and high costs for various parts externally configured, thereby reducing installation complexity, lowering tower rent charges and installation costs, and improving market competitiveness of a product.

Therefore, the microwave communications device according to this embodiment of the present invention can, by providing dual channels and integrating an orthomode transducer inside the microwave communications device, increase a transmission capacity while improving application flexibility, reducing installation complexity, and lowering costs.

In this embodiment of the present invention, optionally, the microwave communications device 100 is an outdoor unit ("ODU" for short), and may also be a communications device including an ODU function, such as a communications device integrating an ODU function and a base station radio remote unit ("RRU" for short) function; for another example, a communications device integrating an ODU function and a base station function, where the base station function includes an RRU function and a base band unit ("BBU" for short) function. Optionally, on one hand, the microwave communications device 100 can be connected to a microwave indoor unit ("IDU" for short) or a base station 220 by using a feeder 210, to convert an intermediate frequency signal or a baseband signal from the IDU or the base station 220 into a microwave signal, or to convert a microwave signal into an intermediate frequency signal or a baseband signal and send the intermediate frequency signal or baseband signal to the IDU or the base station 220. The feeder 210, for example, is an intermediate frequency cable or a twisted pair.

On the other hand, the microwave communications device 100 can be connected to an antenna system 230 directly or connected to the antenna system 230 by using a radio frequency cable, to convert a baseband signal or an intermediate frequency signal into a microwave signal and send the microwave signal to the antenna system 230, or to receive a microwave signal from the antenna system 230 and convert the microwave signal into an intermediate frequency signal or a baseband signal.

Figure 2:
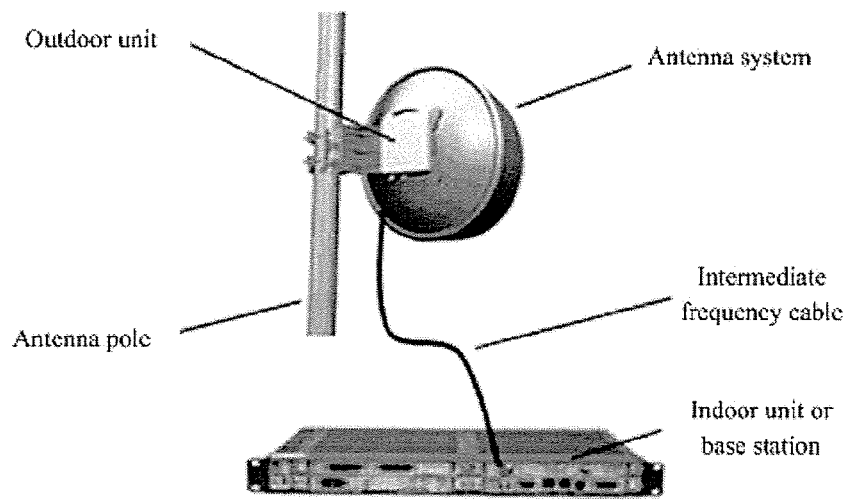
FIG. 2 is a schematic diagram of an application scenario of a microwave communications device according to an embodiment of the present invention.

It should be understood that the technical solutions according to this embodiment of the present invention may be applied to various microwave communications systems. The following describes the microwave communications device according to this embodiment of the present invention by using an application scenario shown in FIG. 2 as an example. At a transmit end, an indoor unit or a base station modulates a baseband signal from a user terminal, converts the baseband signal into an intermediate frequency signal, and transmits the intermediate frequency signal to an outdoor unit by using an intermediate frequency cable; the outdoor unit converts the intermediate frequency signal into a microwave signal, amplifies the microwave signal, and then sends out the microwave signal by using an antenna system. At a receive end, the antenna system sends the received microwave signal to the outdoor unit; the outdoor unit converts the microwave signal into an intermediate frequency signal and transmits the intermediate frequency signal to the indoor unit or base station by using an intermediate frequency cable; and the indoor unit or base station demodulates the intermediate frequency signal, converts the intermediate frequency signal into a baseband signal, and sends the baseband signal to the user terminal.

It should be understood that, in this embodiment of the present invention, the microwave communications device may also be another device that has a function of performing mutual conversion between a baseband signal or an intermediate frequency signal and a microwave signal, and a function of performing separation and synthesis of orthogonally polarized microwave signals. This embodiment of the present invention is described by using only a microwave communications device that is an ODU having dual channels and integrating OMT as an example, but the present invention is not limited thereto.

In this embodiment of the present invention, the microwave communications device can flexibly work in various manners, such as 1+1 manner or XPIC manner, which is described in more details below.

For the microwave communications device 100 shown in FIG. 1, when the first converting module 110 and the second converting module 120 have a same working frequency, and the first polarization direction and the second polarization direction are perpendicular to each other, that is, polarization direction of a microwave signal received or output by the first converting module 110 is perpendicular to a microwave signal received or output by the second converting module 120, for example, the first polarization direction is a horizontal direction and the second polarization direction is a vertical direction, or the first polarization direction is a vertical direction and the second polarization direction is a horizontal direction, and in this case, the microwave communications device 100 can work in the XPIC manner or in the 1+1 manner.

Specifically, if two channels of the microwave communications device 100 work at the same time, because working frequencies of the two channels are the same and polarization directions of microwave signals of the two channels are perpendicular to each other, in comparison with a traditional single-channel ODU, the microwave communications device 100 can improve frequency spectrum utilization to make a transmission capacity doubled, that is, the microwave communications device 100 works in the XPIC manner at this time.

The 1+1 manner may also be used in the foregoing application scenario of working in the XPIC manner. Specifically, because the working frequencies of the two channels are the same, for the two channels, only one channel is working every time and the other channel is in a silence state, when a signal in the working channel is faulty, a switchover to the other channel occurs immediately by using fault detection of a link signal. In this case, the microwave communications device 100 works in the 1+1 manner.

It should be understood that, in this embodiment of the present invention, working frequencies of the converting module 110 and the second converting module 120 can be controlled by using a control signal, and the converting module 110 and the second converting module 120 can be, by using a control signal, controlled to work at the same time, or only one of them is controlled to work, that is, enabling two channels to work or only one channel to work, thereby easily controlling the microwave communications device 100 to work in the XPIC manner or in the 1+1 manner, and further improving flexibility and convenience of applications of the microwave communications device.

It should also be understood that, in this embodiment of the present invention, terms "first", "second", and "third" are merely used to differentiate modules, units, or interfaces, and should not constitute any limitation to this embodiment of the present invention. For example, a first converting module may be referred to as a second converting module, a second converting module may also be referred to as a first converting module, a first converting module may be connected to a second waveguide port, and a second converting module may also be connected to a first waveguide port.

Figure 3:
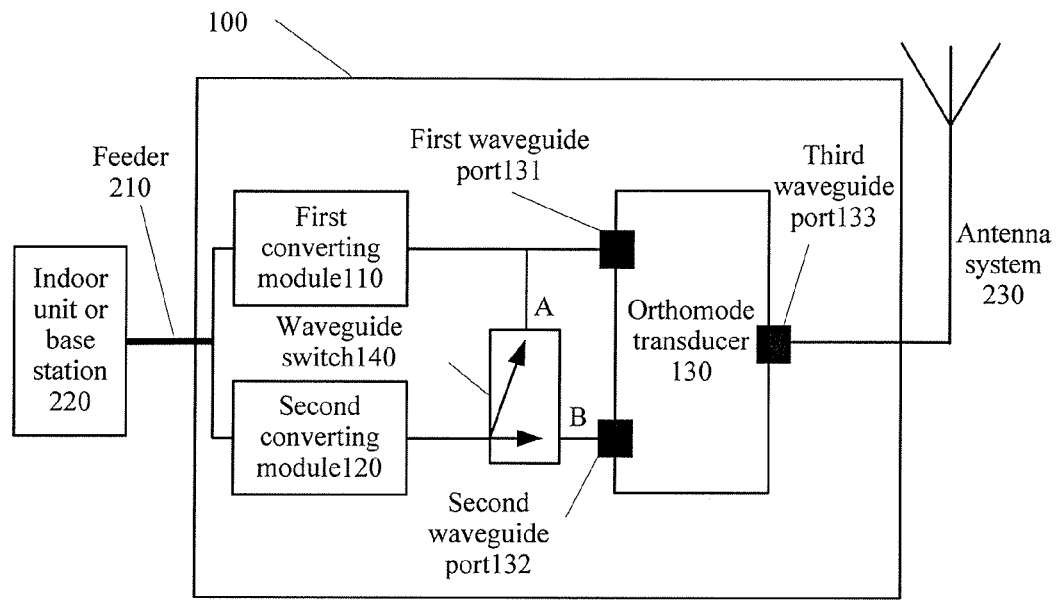
FIG. 3 is another schematic block diagram of a microwave communications device according to an embodiment of the present invention.

FIG. 3 shows another schematic block diagram of the microwave communications device 100 according to this embodiment of the present invention. As shown in FIG. 3, the microwave communications device 100 further includes:

a waveguide switch 140, configured to selectively switch between a first connection position A and a second connection position B, and is used for polarization conversion between microwave signals, so that: when the waveguide switch 140 is in the first connection position A, the waveguide switch 140 is connected to the second converting module 120 and the first waveguide port 131 of the orthomode transducer 130, and a received or output microwave signal has the first polarization direction; when the waveguide switch 140 is in the second connection position B, the waveguide switch 140 is connected to the second converting module 120 and the second waveguide port 132 of the orthomode transducer 130, and a received or output microwave signal has a polarization direction perpendicular to the first polarization direction.

Specifically, as shown in FIG. 3, the microwave communications device 100 includes: the first converting module 110, the second converting module 120, the orthomode transducer 130, and the waveguide switch 140. The orthomode transducer 130 includes the first waveguide port 131, the second waveguide port 132, and the third waveguide port 133; and the polarization directions of microwave signals received or output by the first waveguide port 131 and microwave signals received or output by the second waveguide port 132 are perpendicular to each other. The first converting module 110 is connected to the first waveguide port 131, the second converting module 120 is connected to the first waveguide port 131 or the second waveguide port 132 by using the waveguide switch 140, the antenna system 230 is connected to the third waveguide port 133, and the first converting module 110 and the second converting module 120 are connected to the indoor unit or the base station 220 by using the feeder 210.

The waveguide switch 140 can be selectively connected to the waveguide port 131 or the waveguide port 132 of the orthomode transducer 130, thereby enabling the second converting module 120 to be selectively connected to the waveguide port 131 or the waveguide port 132. For example, as shown in FIG. 3, when the waveguide switch 140 is in the first connection position A, the waveguide switch 140 is connected to the first waveguide port 131, and in this case, a microwave signal received or output by the waveguide switch 140 has the first polarization direction and the first converting module 110 and the second converting module 120 both are connected to the first waveguide port 131; when the waveguide switch 140 is in the second connection position B, the waveguide switch 140 is connected to the second waveguide port 132, and in this case, a polarization direction of a microwave signal received or output by the waveguide switch 140 is perpendicular to the first polarization direction, and specially, when the first polarization direction is perpendicular to a second polarization direction, the polarization direction is the second polarization direction, the first converting module 110 is connected to the first waveguide port 131, and the second converting module 120 is connected to the second waveguide port 132.

In this embodiment of the present invention, optionally, by changing a connection position of the waveguide switch 140 and controlling the working frequencies of the first converting module 110 and the second converting module 120, the microwave communications device 100 can flexibly work in various manners, such as, 1+1 manner, 2+0 manner, or XPIC manner, which is described in more details below.

It should be understood that, in this embodiment of the present invention, the waveguide switch 140 has a function of changing a polarization direction of a signal transmitted by the second converting module 120, so that the transmitted signal has the first polarization direction when the waveguide switch 140 is connected to the first waveguide port 131; so that the transmitted signal has the polarization direction perpendicular to the first polarization direction when the waveguide switch 140 is connected to the second waveguide port 132. Specifically, for example, as shown in FIG. 3, when the waveguide switch 140 is in the position A, the second converting module 120 is connected to the first waveguide port 131 by using the waveguide switch 140, and in this case, a polarization direction of a signal transmitted by the waveguide switch 140 has a first polarization direction; when the waveguide switch 140 is in the position B, the second converting module 120 is connected to the second waveguide port 132 by using the waveguide switch 140, and in this case, a polarization direction of a signal transmitted by the waveguide switch 140 is perpendicular to the first polarization direction.

As shown in FIG. 3, when the waveguide switch 140 is in the position A, that is, when the second converting module 120 is connected to the first waveguide port 131 by using the waveguide switch 140, the first converting module 110 and the second converting module 120 both are connected to the first waveguide port 131. Because when the waveguide switch 140 is in the position A, microwave signals received or output by the waveguide switch 140 and microwave signals received or output by the first converting module 110 have a same polarization direction, namely, the first polarization direction, the first polarization direction of microwave signals received or output by the first converting module 110 and the second polarization direction of microwave signals received or output by the second converting module 120 may be the same or may also be perpendicular to each other.

In this case, if the working frequencies of the first converting module 110 and the second converting module 120 are set to be the same, the microwave communications device 100 works in a 1+1 hot standby manner. That is, only one channel of the microwave communications device 100 works and the other working channel is in a silence state. For example, when a channel of the first converting module 110 is working, a channel of the second converting module 120 is in the silence state, or when the channel of the second converting module 120 is working, the channel of the first converting module 110 is in the silence state. When a channel that is working fails, the other channel works, thereby improving communication reliability.

In this case, if the working frequencies of the first converting module 110 and the second converting module 120 are set to be different, the microwave communications device 100 works in the 2+0 manner. That is, the two channels of the microwave communications device 100 both are working and the working frequencies are different, and therefore, a transmission capacity of a system is doubled in comparison with a single device or a single channel.

It should also be understood that, in this embodiment of the present invention, as shown in FIG. 3, when the waveguide switch 140 is in the position A, the waveguide switch 140 is connected to the first waveguide port 131. In this case, a signal transmitted by the first converting module 110 and a signal transmitted by the waveguide switch 140 may be combined before entering the first waveguide port 131 of the OMT 130, and may also be combined inside the OMT 130 after entering the OMT 130. This embodiment of the present invention is not limited thereto.

As shown in FIG. 3, when the waveguide switch 140 is in the position B, that is, when the second converting module 120 is connected to the second waveguide port 132 by using the waveguide switch 140, the first converting module 110 is connected to the first waveguide port 131, and the second converting module 120 is connected to the second waveguide port 132. In this case, if the working frequencies of the first converting module 110 and the second converting module 120 are set to be the same, and the first converting module 110 and the second converting module 120 are enabled to work at the same time, that is, the two channels of the microwave communications device 100 work at the same time, the microwave communications device 100 can be enabled to work in the XPIC manner; and if the working frequency numbers of the first converting module 110 and the second converting module 120 are set to be the same, and only one channel of the microwave communications device 100 is enabled to work, the microwave communications device 100 can be enabled to work in the 1+1 manner, thereby increasing a transmission capacity and improving flexibility and convenience of applications of the microwave communications device.

It should be understood that, when the waveguide switch 140 is in the position A or B, regardless of which manner in which the microwave communications device 100 works, such as, 1+1 manner, 2+0 manner, or XPIC manner, because the waveguide switch 140 can change a polarization direction of a signal transmitted by the second converting module 120, a first polarization direction and a second polarization direction respectively of received or output microwave signals of the first converting module 110 and received or output microwave signals of the second converting module 120 may be the same or may be perpendicular to each other. The present invention is not limited thereto.

Therefore, the microwave communications device according to this embodiment of the present invention can, by providing dual channels and integrating an orthomode transducer inside the microwave communications device to make an ODU with dual channels work in the 1+1 hot standby manner, 2+0 manner, or XPIC manner, increase a transmission capacity or improve transmission reliability while improving application flexibility, reducing installation complexity, and lowering costs.

Figure 4A:
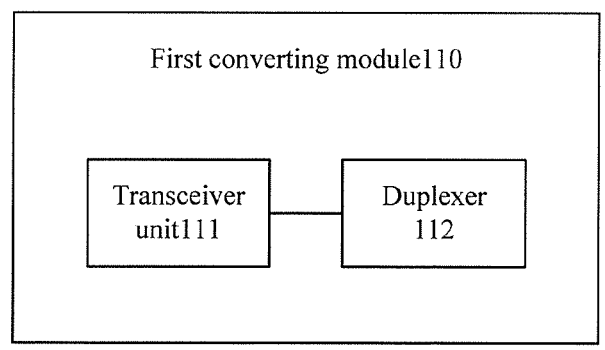
FIG. 4A and FIG. 4B are respectively schematic block diagrams of a first converting module and second converting module, respectively, according to an embodiment of the present invention.
Figure 4B:
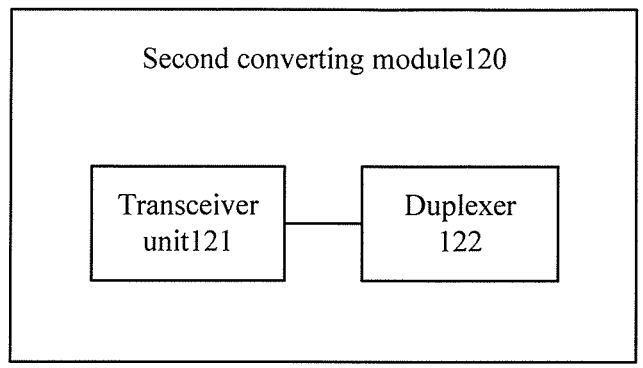

In this embodiment of the present invention, optionally, as shown in FIG. 4A and FIG. 4B, the first converting module 110 includes a transceiver unit 111 and a duplexer 112, and the second converting module 120 includes a transceiver unit 121 and a duplexer 122. The first converting module 110 or the second converting module 120 both have two channels, respectively a receive channel and a transmit channel. The transceiver unit 111 or 121 is configured to perform, in the receive channel and the transmit channel, mutual conversion between a baseband signal or an intermediate frequency signal and a microwave signal; and the duplexer 112 or 122 is configured to isolate a transmit signal from a received signal, to ensure that the receive channel and the transmit channel both can work at the same time.

Figure 5A:
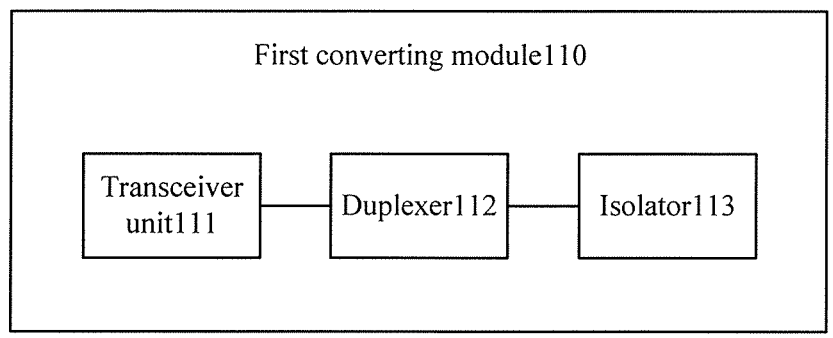
FIG. 5A and FIG. 5B are respectively another schematic block diagrams of a first converting module and second converting module, respectively, according to an embodiment of the present invention.
Figure 5B:
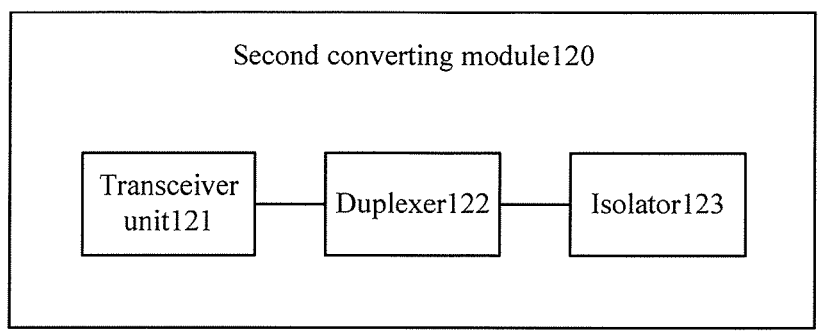

Optionally, as shown in FIG. 5A and FIG. 5B, the first converting module 110 further includes an isolator 113, and/or the second converting module 120 further includes an isolator 123. In this embodiment of the present invention, the isolator 113 or 123 may also be referred to as a "one-way device", which is configured to prevent a signal from reflecting back from one channel to another channel, for example, prevent a signal output by the first converting module 110 from entering a channel of the second converting module 120.

It should be understood that the term "and/or" in the specification merely describes an association relationship between associated objects, indicating that three types of relationships may exist. For example, A and/or B may indicate the following three cases: A exists independently, A and B exist at the same time, and B exists independently. In addition, the symbol "/" in this specification generally indicates that the associated objects are in an "or" relationship.

It should also be understood that, in this embodiment of the present invention, the microwave communications device 100 may further include other module or apparatus. This embodiment of the present invention is not limited thereto. For example, the microwave communications device 100 may further include a power module for supplying power to the microwave communications device 100; for example, the microwave communications device 100 may further include a control module for controlling a connection position of the waveguide switch 140; and for example, a control circuit for currently controlling a waveguide switch may be integrated inside the microwave communications device 100, so as to control the waveguide switch 140, and the control circuit may be controlled according to a corresponding requirement by triggering a signal; and certainly, the control module included in the microwave communications device 100 may control the waveguide switch 140 by using another manner, which is not limited by this embodiment of the present invention hereof.

In this embodiment of the present invention, the control module may also control any one or a combination of: whether the first converting module 110 and the second converting module 120 work, their working frequencies, and polarization directions of their signals. For example, the microwave communications device 100 may be internally configured with a central processing unit (CPU) and a memory, where a preset configuration program is stored in the memory and the CPU performs control by executing the configuration program; and certainly, the microwave communications device 100 may also perform corresponding control by using another method, for example, performing control of: whether to work, working frequencies, or polarization directions of signals according to a requirement by using a control instruction respectively, which is not limited by this embodiment of the present invention hereof.

Therefore, the microwave communications device according to this embodiment of the present invention can, by providing dual channels and integrating an orthomode transducer inside a single microwave communications device, increase a transmission capacity while improving application flexibility, reducing installation complexity, and lowering costs.

Figure 6:
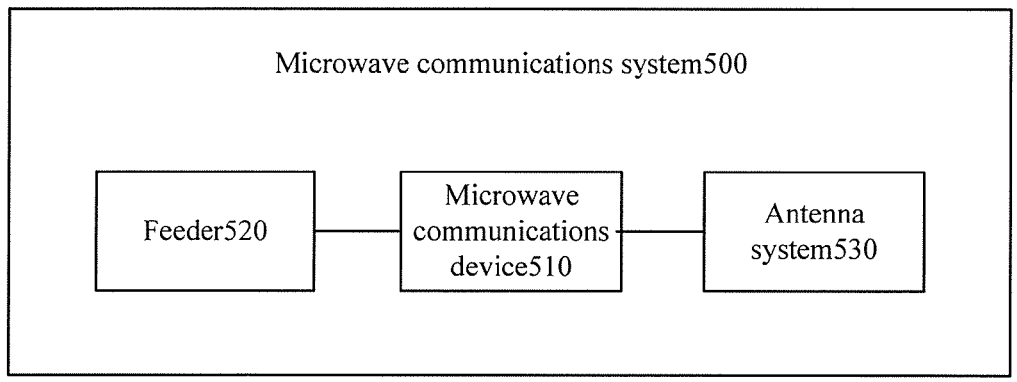
FIG. 6 is a schematic block diagram of a microwave communications system according to an embodiment of the present invention.

An embodiment of the present invention further provides a microwave communications system. As shown in FIG. 6, a microwave communications system 500 according to this embodiment of the present invention includes:
 a microwave communications device 510;
 a feeder 520, configured to connect the microwave communications device 510 to an indoor unit or a base station; and
 an antenna system 530, configured to receive and send a microwave signal, where the antenna system is connected to the microwave communications device 510.

The microwave communications device 510 includes:
 a first converting module and a second converting module, configured to perform mutual conversion between a baseband signal or an intermediate frequency signal and a microwave signal, where microwave signals received or output by the first converting module and microwave signals received or output by the second converting module respectively have a first polarization direction and a second polarization direction, and the first polarization direction and the second polarization direction are the same or perpendicular to each other; and an orthomode transducer, configured to perform separation and synthesis of orthogonally polarized microwave signals, where the orthomode transducer includes a first waveguide port, a second waveguide port, and a third waveguide port, where polarization directions of microwave signals received or output by the first waveguide port and microwave signals received or output by the second waveguide port are perpendicular to each other, and the first waveguide port is connected to the first converting module, the second waveguide port is connected to the second converting module, and the third waveguide port is connected to the antenna system.

Therefore, the microwave communications system according to this embodiment of the present invention can, by providing dual channels and integrating an orthomode transducer inside the microwave communications device to make the microwave communications device with dual channels work in a 1+1 hot standby manner, a 2+0 manner, or an XPIC manner, so as to increase a transmission capacity or improve transmission reliability while improving application flexibility, reducing installation complexity, and lowering costs.

Figure 7:
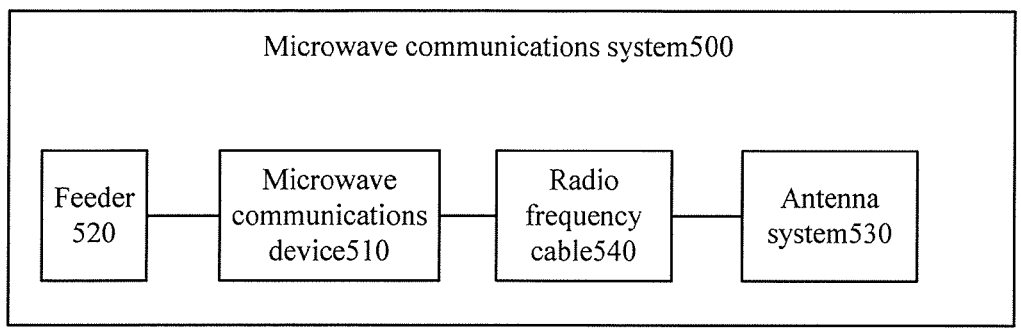
FIG. 7 is another schematic block diagram of a microwave communications system according to an embodiment of the present invention.

In this embodiment of the present invention, optionally, as shown in FIG. 7, the microwave communications device 510 further includes: a radio frequency cable 550, configured to connect the microwave communications device 510 and the antenna system 540. That the microwave communications device 510 is connected to the antenna system 540 by using the radio frequency cable 550.

In this embodiment of the present invention, optionally, working frequencies of the first converting module and the second converting module included in the microwave communications device 510 can be set to be the same, and the first polarization and the second polarization are perpendicular to each other, to make the microwave communications system 500 work in the 1+1 or XPIC manner.

In this embodiment of the present invention, optionally, the microwave communications device 510 further includes: a waveguide switch, where the waveguide switch is configured to selectively switch between a first connection position and a second connection position, and is used for polarization conversion between microwave signals, so that: when the waveguide switch is in the first connection position, the waveguide switch is connected to the second converting module and the first waveguide port of the orthomode transducer and a microwave signal received or output has the first polarization direction; when the waveguide switch is in the second connection position, the waveguide switch is connected to the second converting module and the second waveguide port of the orthomode transducer and a microwave signal received or output has a polarization direction perpendicular to the first polarization direction.

In this embodiment of the present invention, by changing a connection position of the waveguide switch and controlling the working frequencies of the first converting module and the second converting module, the microwave communications system 500 can flexibly work in various manners, such as 1+1 manner, 2+0 manner, or XPIC manner, which is described in more details below.

Optionally, when the waveguide switch is in the first connection position, the working frequencies of the first converting module and the second converting module are the same, so that the microwave communications system 500 can work in the 1+1 manner.

Optionally, when the waveguide switch is in the first connection position, the working frequencies of the first converting module and the second converting module are different, so that the microwave communications system 500 can work in the 2+0 manner.

Optionally, when the waveguide switch is in the second connection position, the working frequencies of the first converting module and the second converting module are the same, so that the microwave communications system 500 can work in the 1+1 or XPIC manner.

Optionally, the first converting module and the second converting module of the microwave communications device 510 include a transceiver unit and a duplexer. Optionally, the first converting module and/or the second converting module of the microwave communications device 510 further includes an isolator. Optionally, the microwave communications device may be an outdoor unit.

It should also be understood that, in this embodiment of the present invention, the microwave communications system 500 may further include another module or device. This embodiment of the present invention is not limited thereto. For example, the microwave communications system 500 may further include a power module for supplying power to the microwave communications system 500; and for example, the microwave communications system 500 may further include a control module for controlling a connection position, whether the first converting module and the second converting module work, their working frequencies and polarization directions of their signals.

It should also be understood that the microwave communications device 510 according to this embodiment of the present invention may correspond to the microwave communications device 100 in the embodiment of the present invention, which is, for brevity, not repeated herein.

Therefore, the microwave communications system according to this embodiment of the present invention can, by providing dual channels and integrating an orthomode transducer inside the microwave communications device, increase a transmission capacity while improving application flexibility, reducing installation complexity, and lowering costs.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, device, and unit, refer to a corresponding process in the foregoing method embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, or may be implemented in electronic, mechanical, or other forms.

The units described as separate parts may or may not be physically separated, and parts displayed as units may or may not be physical units, that is, may be located in one position, or may be distributed on a plurality of network units. Apart or all of the units may be selected according to actual needs to achieve the objectives of the solutions of the embodiments of the present invention.

In addition, each functional unit in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A microwave communications device, comprising:
an orthomode transducer, a first converter and a second converter, wherein the orthomode transducer comprises a first waveguide port connected to the first converter, a second waveguide port connected to the second converter and a third waveguide port connected to an antenna system;
the orthomode transducer is configured to separate microwave signals received from the antenna system to first microwave signals to be transmitted to the first converter and second microwave signals to be transmitted to the second converter, and to synthesize third microwave signals received from the first converter and fourth microwave signals received from the second converter;
the first converter is configured to receive the first microwave signals from the orthomode transducer through the first waveguide port, convert the first microwave signals into first baseband signals or first intermediate frequency signals to be sent to a microwave indoor unit or a base station, convert third baseband signals or third intermediate frequency signals transmitted from the microwave indoor unit or the base station into the third microwave signals and transmit the third microwave signals to the orthomode transducer through the first waveguide port;
the second converter is configured to receive the second microwave signals from the orthomode transducer through the second waveguide port, convert the second microwave signals into second baseband signals or second intermediate frequency signals to be sent to the microwave indoor unit or the base station, convert fourth baseband signals or fourth intermediate frequency signals transmitted from the microwave indoor unit or the base station into the fourth microwave signals and transmit the fourth microwave signals to the orthomode transducer through the second waveguide port;
wherein the first microwave signals have a first polarization direction, the second microwave signals have a second polarization direction, the first polarization direction and the second polarization direction are perpendicular to each other; and
wherein the third microwave signals have a third polarization direction, the fourth microwave signals have a fourth polarization direction, the third polarization direction and the fourth polarization direction are perpendicular to each other.

2. The microwave communications device according to claim 1, wherein the first converter and the second converter have a same working frequency.

3. The microwave communications device according to claim 1, wherein the first converter comprises a transceiver unit and a duplexer.

4. The microwave communications device according to claim 3, wherein the second converter comprises a transceiver unit and a duplexer.

5. The microwave communications device according to claim 4, wherein at least one of the first converter and the second converter comprises an isolator.

6. The microwave communications device according to claim 1, wherein the microwave communications device is an outdoor unit.

7. The microwave communications device according to claim 1, wherein the microwave communications device is connected to an indoor unit or a base station through a feeder.

8. The microwave communications device according to claim 1, wherein the microwave communications device is connected to the antenna system through a radio frequency cable.

9. A microwave communications device, comprising:
an orthomode transducer, comprising a first waveguide port, a second waveguide port, and a third waveguide port, a first converter, a second converter and a waveguide switch with two ends; wherein one end of the waveguide switch connects to the second converter, another end of the waveguide switch connects to either the first waveguide port or the second waveguide port, the first waveguide port connects to the first converter and to the waveguide switch when the waveguide switch is switched to the first waveguide port, the second waveguide port connects to the waveguide switch when the waveguide switch is switched to the second waveguide port, the third waveguide port connects to an antenna system;
the orthomode transducer is configured to:
when the waveguide switch is switched to the first waveguide port, separate microwave signals received from the antenna system to first microwave signals to be transmitted to the first converter and second microwave signal to be transmitted to the second converters, and to synthesize third microwave signals received from the first converter and fourth microwave signals received from the second converter, and when the waveguide switch is switched to the second waveguide port, separate microwave signals received from the antenna system to fifth microwave signals to be transmitted to the first converter and sixth microwave signals to be transmitted to the second converters, and to synthesize seventh microwave signals received from the first converter and eighth microwave signals received from the second converter;

the first converter is configured to:

when the waveguide switch is switched to the first waveguide port, receive the first microwave signals from the orthomode transducer through the first waveguide port, and transmit the third microwave signals to the orthomode transducer through the first waveguide port, and when the waveguide switch is switched to the second waveguide port, receive the fifth microwave signals from the orthomode transducer through the first waveguide port, and transmit the seventh microwave signals to the orthomode transducer through the first waveguide port;

the second converter is configured to:

when the waveguide switch is switched to the first waveguide port, receive the second microwave signals from the orthomode transducer through the first waveguide port, and transmit the fourth microwave signals to the orthomode transducer through the first waveguide port, and when the waveguide switch is switched to the second waveguide port, receive the sixth microwave signals from the orthomode transducer through the second waveguide port, and transmit the eighth microwave signals to the orthomode transducer through the second waveguide port;

wherein the first microwave signals and the second microwave signals have a same polarization direction; wherein the third microwave signals and the fourth microwave signals have a same polarization direction; and wherein the fifth microwave signals have a first polarization direction, the sixth microwave signals have a second polarization direction, the first polarization direction and the second polarization direction are perpendicular to each other; wherein the seventh microwave signals have a third polarization direction, the eighth microwave signals have a fourth polarization direction, the third direction and the fourth polarization direction are perpendicular to each other.

10. The microwave communications device according to claim 9, wherein when the waveguide switch is switched to the first waveguide port, the working frequencies of the first converter and the second converter are the same.

11. The microwave communications device according to claim 9, wherein when the waveguide switch is switched to the first waveguide port, the working frequencies of the first converter and the second converter are different.

12. The microwave communications device according to claim 9, wherein when the waveguide switch is switched to the second waveguide port, the working frequencies of the first converting module and the second converting module are the same.

13. The microwave communications device according to claim 9, wherein the first converter comprises a transceiver unit and a duplexer.

14. The microwave communications device according to claim 13, wherein the second converter comprises a transceiver unit and a duplexer.

15. The microwave communications device according to claim 14, wherein at least one of the first converter and the second converter further comprises an isolator.

16. The microwave communications device according to claim 9, wherein the microwave communications device is an outdoor unit.

17. The microwave communications device according to claim 9, wherein the first converter and the second converter are configured to perform mutual conversion between a baseband signal or an intermediate frequency signal and a microwave signal.

18. The microwave communications device according to claim 9, wherein the microwave communications device is connected to an indoor unit or a base station through a feeder.

19. The microwave communications device according to claim 9, wherein the microwave communications device is connected to the antenna system through a radio frequency cable.

* * * * *